United States Patent
Raddant et al.

(10) Patent No.: US 6,870,510 B2
(45) Date of Patent: Mar. 22, 2005

(54) BUMPER-AERIAL ASSEMBLY

(75) Inventors: Hans-Joachim Raddant, Berlin (DE); Heinrich Wilken, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/380,177

(22) PCT Filed: Sep. 8, 2001

(86) PCT No.: PCT/DE01/03451
§ 371 (c)(1),
(2), (4) Date: Sep. 10, 2003

(87) PCT Pub. No.: WO02/23668
PCT Pub. Date: Mar. 21, 2002

(65) Prior Publication Data
US 2004/0027301 A1 Feb. 12, 2004

(30) Foreign Application Priority Data
Sep. 12, 2000 (DE) .......................................... 100 44 936

(51) Int. Cl.[7] .................................................. H01Q 1/32
(52) U.S. Cl. ........................ 343/711; 343/713; 343/770
(58) Field of Search ................................. 343/711, 713, 343/767, 770, 850, 853

(56) References Cited

U.S. PATENT DOCUMENTS

| | | | | |
|---|---|---|---|---|
| 4,692,769 A | | 9/1987 | Gegan | 343/700 MS |
| 5,977,919 A | * | 11/1999 | Kudo et al. | 343/713 |
| 6,433,748 B1 | * | 8/2002 | Ekelund | 343/713 |

FOREIGN PATENT DOCUMENTS

| | | | |
|---|---|---|---|
| DE | 196 36 584 | 3/1998 | H01Q/1/32 |
| EP | 0 580 590 | 2/1996 | H01Q/1/32 |
| EP | 0 892 458 | 1/1999 | H01Q/1/32 |
| EP | 0 892 459 | 1/1999 | H01Q/9/04 |
| EP | 0 952 625 | 10/1999 | H01Q/5/01 |

* cited by examiner

Primary Examiner—Hoang V. Nguyen
(74) Attorney, Agent, or Firm—Kenyon & Kenyon

(57) ABSTRACT

A bumper antenna assemblage that permits improved reception is described. The bumper antenna assemblage comprises an antenna element in a bumper of a vehicle body, the antenna element being constituted by an electrically conductive surface in the bumper. The electrically conductive surface forms, on a side facing toward the vehicle body, a slot with respect to the body panel. An antenna terminal is provided at at least two different points on the electrically conductive surface.

27 Claims, 5 Drawing Sheets

BUMPER-AERIAL ASSEMBLY

FIELD OF THE INVENTION

The present invention relates to a bumper antenna assemblage.

BACKGROUND INFORMATION

European Published Patent Application No. 0 580 590 describes two individual VHF antennas with differing directional characteristics, integrated into the bumper of a motor vehicle, which are connected together so as to achieve an all-around directional diagram for the antenna voltage. In this context, an individual VHF antenna includes an electrically conductive surface that is tuned via a series-connected inductance to the reception frequency in the VHF broadcast region.

SUMMARY OF THE INVENTION

In accordance with an exemplary bumper antenna assemblage of the present invention, an electrically conductive surface forms, on a side facing toward the vehicle body, a slot with respect to the body panel. An antenna terminal is provided at at least two different points on the electrically conductive surface. Thus, at least two mutually independent antennas may be integrated into the bumper that may be used, for example, for an antenna diversity system. As a result of the different points for the antenna terminals on the electrically conductive surface, with the antennas thus formed, a frequency region may be covered that altogether is comparatively larger, such as, for example, the entire TV region from band I to band V, and additionally the VHF broadcast region. The different points for the antenna terminals furthermore may permit an implementation of different directional diagrams for the individual antennas associated with the respective antenna terminal. This may increase the reception probability of the overall bumper antenna assemblage when receiving signals from different directions.

The electrically conductive surface may extend substantially over the entire width of the bumper. The electrically conductive surface may thus be comparatively large, so that even low frequencies, such as, for example, in TV band I, may still be received effectively.

Several inputs of the diversity receiver may be active simultaneously. The antenna signals of the various antenna terminals may thus be added in terms of phase and/or amplitude, for example in order to establish a desired directional characteristic for diversity reception.

Inactive inputs of the diversity receiver may be electrically disconnected, such as, for example via switches, from the respectively associated antenna terminal. Thereby a kind of diversity reception may be implemented in which the only antennas or antenna terminals connected to the diversity receiver are those that are furnishing the signal with the highest reception field strength or the lowest interference component.

Activation of a controlled switch may be accomplished by transferring a control signal on the antenna cable associated with the switch, the control signal being superimposed on an antenna signal. As a result, a separate control line for activating the switch may not be required.

The electrically conductive surface may encompass at least one further slot. Thereby a more uniform antenna factor in the frequency region may be achieved to operate the bumper antenna assemblage. In addition, additional resonances may be generated so that the bumper antenna assemblage may be operated in a broader-band frequency region.

An attachment arrangement may be provided which mechanically connects the electronically conductive surface to the vehicle body at the location of at least one of the antenna terminals. The mechanical connection of the electrically conductive surface to the vehicle body may, in this fashion, simultaneously be used to electrically connect one or more antenna terminals on the electrically conductive surface to a respective antenna cable extending in the interior of the vehicle body, or to an amplifier circuit positioned in the interior of the vehicle body. The functionality of the attachment arrangement may thereby be increased, so that no additional mechanical devices may be required in order to convey the electrical connection to the at least one antenna terminal. The result may be a savings of material, assembly effort, and therefore cost.

Because the attachment arrangement may be additionally used to implement the electrical connection between the at least one antenna assemblage and an antenna circuit positioned in the interior of the vehicle body, that electrical connection may also be made optimally short and thus may be affected with little loss.

The attachment arrangement may encompass a peg made of electrically nonconductive material, such as, for example, plastic. The peg may receive an outer attachment part, outside of said electrically insulated from the vehicle body, that carries the electrically conductive surface and receives the associated antenna terminal. The peg may receive an inner contact part inside the vehicle body that may ensure electrical connection between the antenna terminal through the peg and with an inner conductor of the antenna cable associated with the antenna terminal. The peg may be guided through an opening of the vehicle body and may seal it off in watertight fashion. A simple arrangement may result in the form of the peg that implements both mechanical attachment of the electrically conductive surface to the vehicle body, and electrically conductive connection between the antenna terminal and the antenna cable extending within the vehicle body, in which context the peg at the same time electrically insulates the electrically conductive surface from the vehicle body. This type of combined electrical and mechanical connection of the bumper antenna assemblage may entail only minimal effort and therefore minimal cost. The holes in the vehicle body required for mechanical attachment of the electrically conductive surface to the vehicle body may also be used for electrical connection of the at least one antenna terminal to the associated antenna cable inside the vehicle body, so that no additional holes in the body (and therefore no additional sources of corrosion that might diminish the value of the motor vehicle) may be required.

The outer conductor of the antenna cable may be connected in electrically conductive fashion to the vehicle body. If this is done in the interior of the vehicle body directly next to the opening for placement of the peg, this electrical connection to the reference potential surface may then be made in the immediate vicinity of the associated antenna terminal or antenna base, thus achieving a high-frequency connection between the antenna terminal and the antenna cable at which only insignificant losses may be required to be accepted.

The inner contact part may receive an electronic circuit, such as, for example, an amplifier circuit, that is connected in electrically conductive fashion on the input side of the electronic circuit to the antenna terminal through the peg, and on the output side of the electronic circuit to the inner conductor of the antenna cable associated with the antenna terminal. An electronic circuit of this kind may thus be positioned as close as possible to the antenna terminal so that losses between the antenna terminal and the downstream electronic circuit may almost be ruled out.

A simple electrically conductive connection between the antenna terminal and the antenna cable may be obtained if the inner contact part is embodied as an electrically conductive contact strip that is injection-embedded in watertight fashion into the peg and makes contact with an electrically conductive part, connected in electrically conductive fashion to the antenna terminal, of the outer attachment part introduced into the peg.

If the outer attachment part is embodied as an electrically conductive screw and is threaded into the peg, the screw may then provide not only mechanical attachment of the electrically conductive surface to the vehicle body, but also the electrically conductive connection between the antenna terminal and the inner contact part, so that its functionality may be enhanced and the complexity for mechanical and electrical connection of the antenna assemblage may be reduced.

In a flexible manner, the outer attachment part may be joined disengageably to the peg. The electrically conductive surface representing the antenna element may thus be installed onto or removed from the vehicle body as required.

The same may also apply to installation or removal of the inner contact part in the interior of the vehicle body, if the latter is joined disengageably to the peg.

The connection of the outer conductor of the antenna cable to the vehicle body may be embodied as a cover cap which encloses the peg in the interior of the vehicle body. Shielding of the bumper antenna assemblage in the region of the at least one antenna terminal may thereby be achieved, so that the antenna signal coupled out at the at least one antenna terminal is not degraded by interference signals from the interior of the vehicle body, and resistance to interference may thus be enhanced.

Complexity may be reduced if the antenna cable is conveyed to the inner contact part in the region of the peg via a second snap-lock join, in which context a support receives the antenna cable and snap-fits with a snap-lock arrangement of the vehicle body in the region of the peg, the support being made of electrically conductive material and being contacted to the outer conductor of the antenna cable. The cover cap may then be constituted by the support, and the functionality of the support may be enhanced.

DETAILED DESCRIPTION

Figure 1:
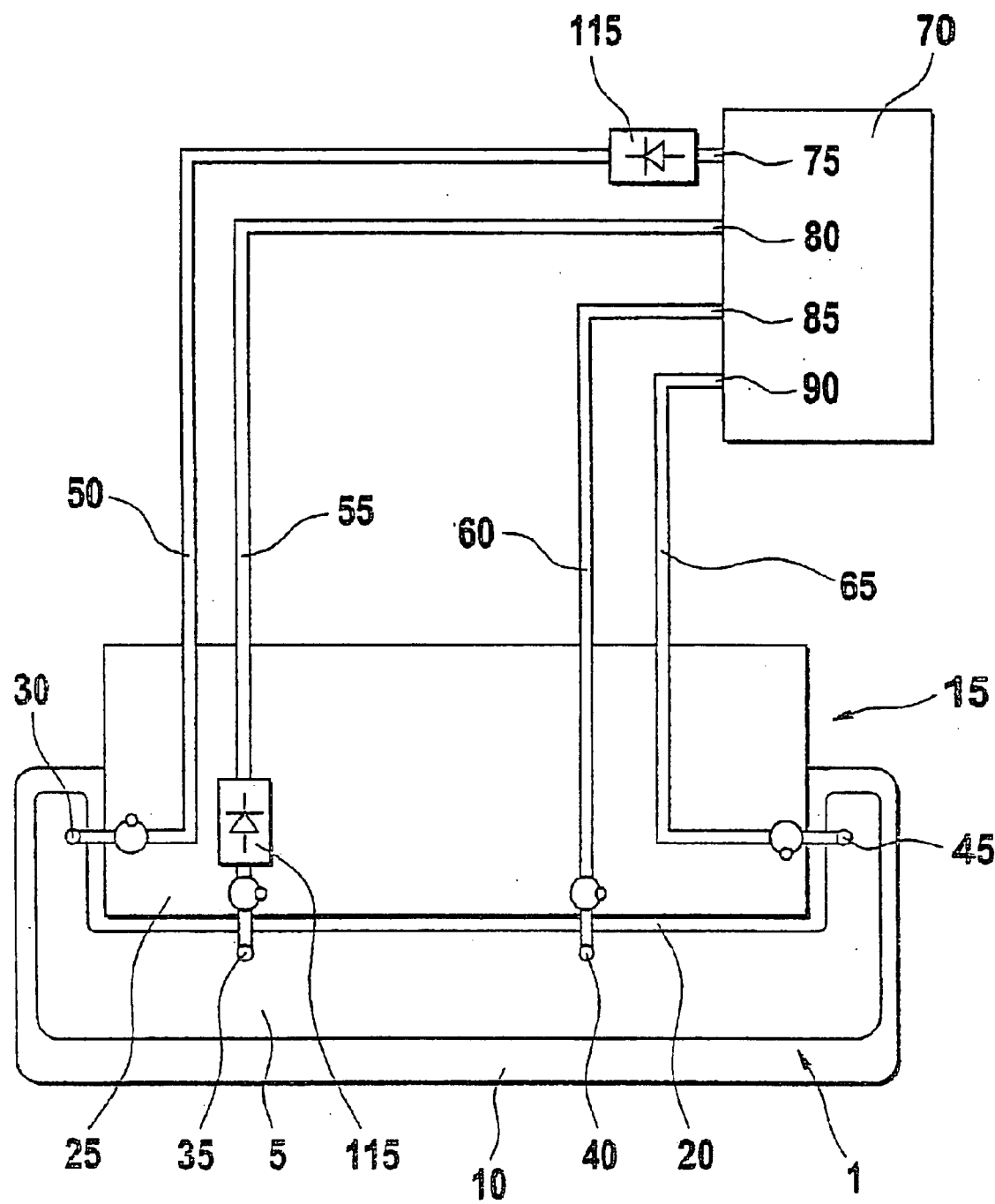
FIG. 1 shows a vehicle body having a bumper antenna assemblage for diversity reception.

In FIG. 1, the number 15 designates a vehicle body, only a portion of which in the region of a bumper 10 is depicted. Bumper 10 is mounted on a body panel 25 of vehicle body 15. Positioned in bumper 10, and electrically insulated from it, is an antenna element 5 in the form of an electrically conductive surface. Electrically conductive surface 5 forms, with body panel 25, a first slot 20 that may be suitable for guiding an electromagnetic wave. As shown in FIG. 1, electrically conductive surface 5 encompasses at different points a first antenna terminal 30, a second antenna terminal 35, a third antenna terminal 40, and a fourth antenna terminal 45. Electrically conductive surface 5 and antenna terminals 30, 35, 40, 45 constitute a bumper antenna assemblage 1. The length of electrically conductive surface 5, taking into account the bent ends (as shown in FIG. 1) of electrically conductive surface 5, defines a lower limit for the lower limit frequency for operation of bumper antenna assemblage 1. This length is almost completely utilized, for example, by first antenna terminal 30 and fourth antenna terminal 45, so that for these two antenna terminals 30, 45, electrically conductive surface 5 constitutes, over almost its entire length taking into account the bent ends, a $\lambda/4$ resonance and further resonances at $\lambda/4+n\lambda/2$, where n=1, 2, 3, . . . The upper limit for the lower limit frequency of bumper antenna assemblage 1 is achieved with an antenna terminal approximately in the center of electrically conductive surface 5, since then only half the length of electrically conductive surface 5 is available for constituting a $\lambda/4$ resonance and further resonances at $\lambda/4+n\lambda/2$, where n=1, 2, 3, . . . Since second antenna terminal 35 and third antenna terminal 40 are not center-positioned on electrically conductive surface 5, the lower limit frequency thereby achieved lies, in the exemplary embodiment shown in FIG. 1, between the lower and upper limits for the lower limit frequency. The different antenna terminals 30, 35, 40, 45 on electrically conductive surface 5 allow the implementation of mutually independent antennas, each antenna terminal 30, 35, 40, 45 on electrically conductive surface 5 resulting in a respective antenna whose resonances $\lambda/4$, $\lambda/4+n\lambda/2$, n=1, 2, 3, . . . depend on the spacing of the respective antenna terminal from the edge of the electrically conductive surface in the longitudinal direction, taking into account the bending of electrically conductive surface 5 as shown in FIG. 1. Because of the different points at which antenna terminals 30, 35, 40, 45 are positioned on electrically conductive surface 5, a different directional diagram may be obtained for each antenna constituted by such an antenna terminal, since the relationships of the electromagnetic field at the various locations of antenna terminals 30, 35, 40, 45 are different. The directional diagrams for each of antenna terminals 30, 35, 40, 45 are also frequency-dependent, since different current flow directions on electrically conductive surface 5 are obtained for the resonances ($\lambda 4$, $\lambda/4+n\lambda/2$, wherein =1, 2, 3, . . . ) achievable at an antenna terminal, and different electromagnetic field relationships are thus in turn created.

In the exemplary embodiment of FIG. 1, electrically conductive surface 5 extends substantially over the entire width of bumper 10. A result of this may be that, for first antenna terminal 30 and fourth antenna terminal 45, for example, a long resonance length may be produced for the $\lambda/4$ resonance, thus resulting in a desirably low lower limit frequency for operation of bumper antenna assemblage 1.

Bumper antenna assemblage 1 shown in FIG. 1 may be used for diversity reception. For that purpose, antenna terminals 30, 35, 40, 45 are connected, via respective antenna cables 50, 55, 60, 65, to a diversity receiver 70. First antenna terminal 30 is connected via a first antenna cable 50 to a first input 75 of diversity receiver 70. Second antenna terminal 35 is connected via a second antenna cable 55 to a second input 80 of diversity receiver 70. Third antenna terminal 40 is connected via a third antenna cable 60 to a third input 85 of diversity receiver 70. Fourth antenna terminal 45 is connected via a fourth antenna cable 65 to a fourth input 90 of diversity receiver 70. Antenna terminals 30, 35, 40, 45 are each respectively connected to the inner conductor of the associated antenna cable, whereas the outer conductor of the corresponding antenna cable is connected to body panel 25 as reference potential.

Two exemplary types of diversity reception may be implemented. In a first exemplary type of diversity reception, several of inputs 75, 80, 85, 90 of diversity receiver 70 are active simultaneously. As a result, the antenna signals received at the antenna terminals associated with the active inputs may be superimposed in diversity receiver 70 in terms of phase and/or amplitude. In this case for example, the physical distance between the antenna terminals may not be made too small. Otherwise the coupling between two closely adjacent antenna terminals may be so great that almost the same antenna signal may be present at those two antenna terminals. Superimposition of the two signals in diversity receiver 70 may not then yield a qualitatively new antenna signal. The positions of antenna terminals 30, 35, 40, 45 on electrically conductive surface 5 may therefore be selected so that they are spaced apart at least by a specified distance, the distance being specified so that the antenna signals obtained for the individual antenna terminals 30, 35, 40, 45 may differ substantially from one another. A qualitatively new antenna signal, and a qualitatively new directional characteristic for the overall bumper antenna assemblage 1, may then be generated in diversity receiver 70.

For the operating mode described above, at least two of inputs 75, 80, 85, 90 of diversity receiver 70 may be required to be active. Inactive inputs of diversity receiver 70 may be electrically disconnected from the respective antenna terminal, for example via a controlled switch 115. Controlled switch 115 may be embodied, for example, as a PIN diode. Controlled switch 115 may be positioned either directly at the antenna base, e.g., between the corresponding antenna terminal and the associated antenna cable. Alternatively, for relatively short antenna cables, in the associated receiver input, as depicted schematically in FIG. 1 using the example of first input 75 of diversity receiver 70. The use of a PIN diode for controlled switch 115 may be a desired choice at least when controlled switch 115 is positioned directly at or at least close to the antenna base, in which case activation may be accomplished from the connected diversity receiver 70 via the corresponding antenna cable, using a control signal superimposed on the antenna signal. A controlled switch 115 in the form of a PIN diode, positioned close to the antenna base, is schematically depicted in FIG. 1 for second antenna cable 55.

In a second exemplary type of diversity reception, only one of inputs 75, 80, 85, 90 of diversity receiver 70 is active. That input is examined for interference in the signal received via the connected antenna cable. If interference is detected, operation is switched to a different input and the procedure described is repeated for that different input.

Figure 2:
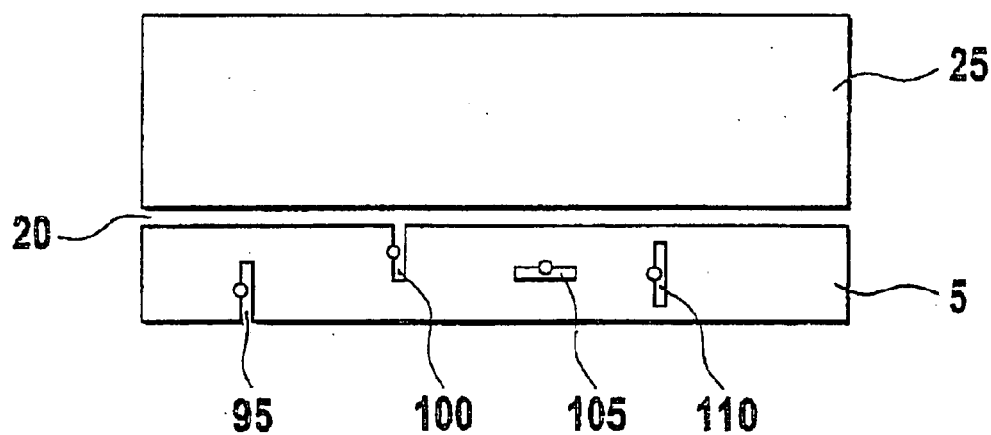
FIG. 2 schematically depicts the bumper antenna assemblage with the use of additional slots.

FIG. 2 shows a further exemplary embodiment in which bumper antenna assemblage 1 is reproduced schematically and without depiction of the antenna terminals. Here as in the first exemplary embodiment described with reference to FIG. 1, electrically conductive surface 5 forms first slot 20, which may be suitable for guiding an electromagnetic wave, with body panel 25. In addition, electrically conductive surface 5 encompasses further slots 95, 100, 105, 110 that are positioned vertically or horizontally in electrically conductive surface 5. A second slot 95 extends perpendicular to first slot 20 and ends at the side of electrically conductive surface 5 facing away from body panel 25. A third slot 100 also extends perpendicular to first slot 20, begins at first slot 20, and ends within electrically conductive surface 5. A fourth slot 105 extends horizontally and thus parallel to first slot 20 within electrically conductive surface 5. A fifth slot 110 extends once again perpendicular to first slot 20, but within electrically conductive surface 5. Via one or more slots 95, 100, 105, 110 in electrically conductive surface 5, the currents flowing on electrically conductive surface 5 may be deflected so that the current flow paths are extended. As a result, the resonant frequencies of the antennas constituted by antenna terminals 30, 35, 40, 45 on electrically conductive surface 5 may be shifted. Fine-tuning of the resonant frequencies may thus be achieved by appropriate positioning of slots 95, 100, 105, 110 in electrically conductive surface 5. In addition, by suitable positioning of one or more of slots 95, 100, 105, 110 in electrically conductive surface 5, currents may be deflected so that no prominent resonances are formed, in order to achieve a homogeneous antenna factor or homogeneous antenna amplification over the entire desired operating frequency range of bumper antenna assemblage 1. Via one or more slots 95, 100, 105, 110 in electrically conductive surface 5, principal resonances may be reduced and additional resonances may be generated, so that the desired operating frequency region may also be made broader.

With conventional bumper dimensions and an electrically conductive surface 5 extending over the entire width of bumper 10, signal reception may be achieved at least in the entire TV region from band I to band V, and in the VHF broadcast region.

Because of the positioning of antenna terminals 30, 35, 40, 45 at different points on electrically conductive surface 5, different directional diagrams are obtained for the individual antennas constituted by antenna terminals 30, 35, 40, 45 while maintaining the specified distance between two adjacent antenna terminals, so that in the context of multipath reception, electromagnetic waves arriving from different directions add up differently at the various antennas. As a result, when diversity receiver 70 switches over from an antenna currently affected by reception interference to another antenna, that other antenna may not be experience interference.

Bumper antenna assemblage 1 according to an exemplary embodiment of the present invention may also be implemented with more or fewer than four antenna terminals, but at least two antenna terminals on electrically conductive surface 5 may be required for implementation of the present invention.

Bumper antenna assemblage 1 may be suitable for vehicles without a fixed roof structure, such as, for example, convertibles, which may not be equipped with a rear-window antenna or a roof antenna.

In the operating mode of diversity receiver 70 with several active inputs, all inputs 75, 80, 85, 90 as shown in FIG. 1 may be active, for example, simultaneously.

An improvement in reception as compared to a single bumper antenna may be achieved with an exemplary bumper antenna assemblage according to the present invention, having several mutually independent antennas that nevertheless are positioned on a common antenna element in the form of electrically conductive surface 5.

The attachment of electrically conductive surface 5 to vehicle body 15 is described below. In the configuration in which several antenna terminals 30, 35, 40, 45 are positioned on electrically conductive surface 5, for example, the installation complexity for attaching electrically conductive surface 5 to vehicle body 15 may be great if the electrical connections of antenna terminals 30, 35, 40, 45 to the respectively associated antenna cables 50, 55, 60, 65 in the interior of vehicle body 15, and the mechanical connections of electrically conductive surface 5, were required to be made separately from one another. For this reason, at the locations of antenna terminals 30, 35, 40, 45 electrically conductive surface 5 is both electrically connected to the associated antenna cables 50, 55, 60, 65 and mechanically joined to vehicle body 15.

Figure 4:
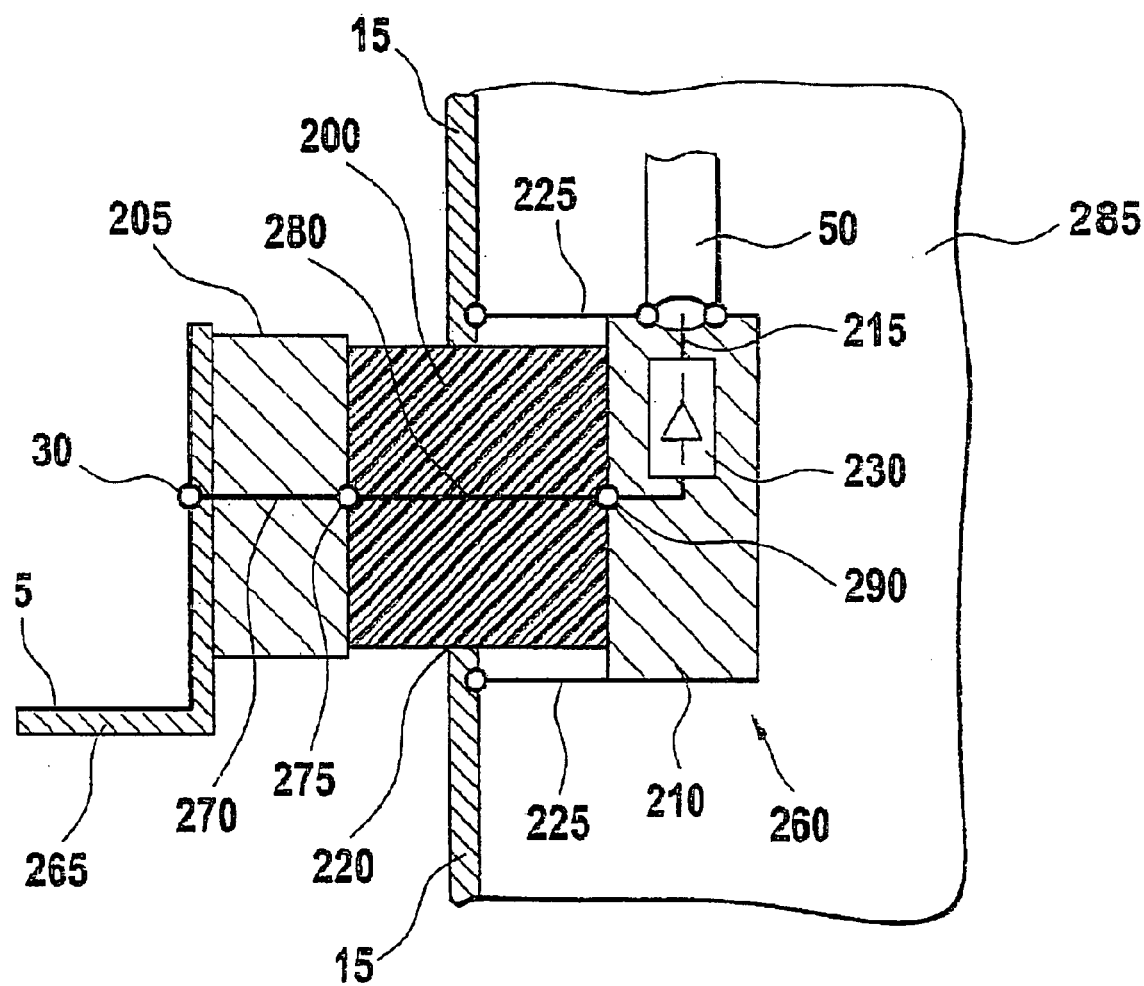
FIG. 4 is a sectioned depiction of the attachment arrangement in a general form.

This mechanical and electrical connection may be implemented as depicted in FIG. 4. In body 15, an opening 220 is provided through which a peg 200 is guided so that, for example, it seals in watertight fashion with respect to vehicle body 15 and is made of electrically insulating material, for example of plastic. Peg 200 receives, outside of and electrically insulated from vehicle body 15, an outer attachment part 205. Peg 200 and outer attachment part 205 constitute an attachment arrangement that attaches a first support 265, with electrically conductive surface 5 positioned thereon, to vehicle body 15, electrically conductive surface 5 being electrically insulated from vehicle body 15 because peg 200 is made of electrically insulating material. First support 265 with electrically conductive surface 5 is carried by outer attachment part 205. In the region of outer attachment part 205, electrically conductive surface 5 has, representatively, first antenna terminal 30. Via a first electrically conductive connection 270, first antenna terminal 30 is connected to a first connecting point 275 at the transition between outer attachment part 205 and peg 200. First connecting point 275 connects first electrically conductive connection 270 to a leadthrough conductor 280 that is passed, e.g., in the form of a wire, through peg 200 and is guided to a second connecting point 290 in interior 285 of vehicle body 15. In interior 285 of vehicle body 15, peg 200 receives an inner contact part 210. Inner contact part 210 ensures electrically conductive connection between first antenna terminal 30 through peg 200, and to an inner conductor 215 of first antenna cable 50 associated with first antenna terminal 30. Second connecting point 290 is thus positioned at the transition between peg 200 and inner contact part 210, and connects lead-through conductor 280 to inner conductor 215 of first antenna cable 50 in interior 285 of vehicle body 15. Optionally, inner contact part 210 may be configured or enlarged so that an electronic circuit 230, for example an electrical amplifier, is positioned in inner contact part 210 and is connected in electrically conductive fashion on the input side of electronic circuit 230 to second connecting point 290 and thus to first antenna terminal 30 through peg 200, and on the output side of electronic circuit 230 to inner conductor 215 of first antenna cable 50 associated with first antenna terminal 30. An outer conductor 225 of first antenna cable 50 is connected in electrically conductive fashion to vehicle body 15 in the region of opening 220 of vehicle body 15. The connection of outer conductor 225 of first antenna cable 50 to vehicle body 15 may be embodied as cover cap 260 which encloses peg 200 in interior 285 of vehicle body 15. In this fashion, first antenna terminal 30 may be completely shielded by vehicle body 15 and cover cap 260 from electrical interference signals generated from interior 285 of vehicle body 15, so that the antenna signal coupled out from first antenna terminal 30 may be passed to first antenna cable 50 in a largely interference-free manner.

First support 265 may be permanently joined to outer attachment part 205. First antenna cable 50 may be permanently joined to inner contact part 210.

Outer attachment part 205, peg 200, and inner contact part 210 may be combined in various manners. The mechanical connection between the parts may be nondisengageable (i.e. permanent) or disengageable. Disengageable connections may be implemented, for example, via threaded or snap-lock joins.

The mechanical join between peg 200 and vehicle body 15 may be disengageable, but is embodied so that it is locked when peg 200 is in the installed state, and therefore may not accidentally fall out of opening 220. The mechanical join between outer attachment part 205 and peg 200, and the mechanical join between peg 200 and inner contact part 210, may also be embodied disengageably in each case. Alternatively, provision may be made for the mechanical join between outer contact part 205 and peg 200 to be permanent, and the mechanical join between peg 200 and inner contact part 210 to be disengageable. In addition, provision may alternatively be made for the mechanical join between outer contact part 205 and peg 200 to be embodied disengageably, and for the mechanical join between peg 200 and inner contact part 210 to be embodied permanently.

The exemplary configuration described in accordance with FIG. 4 is further discussed below with reference to three embodiments.

Figure 3:
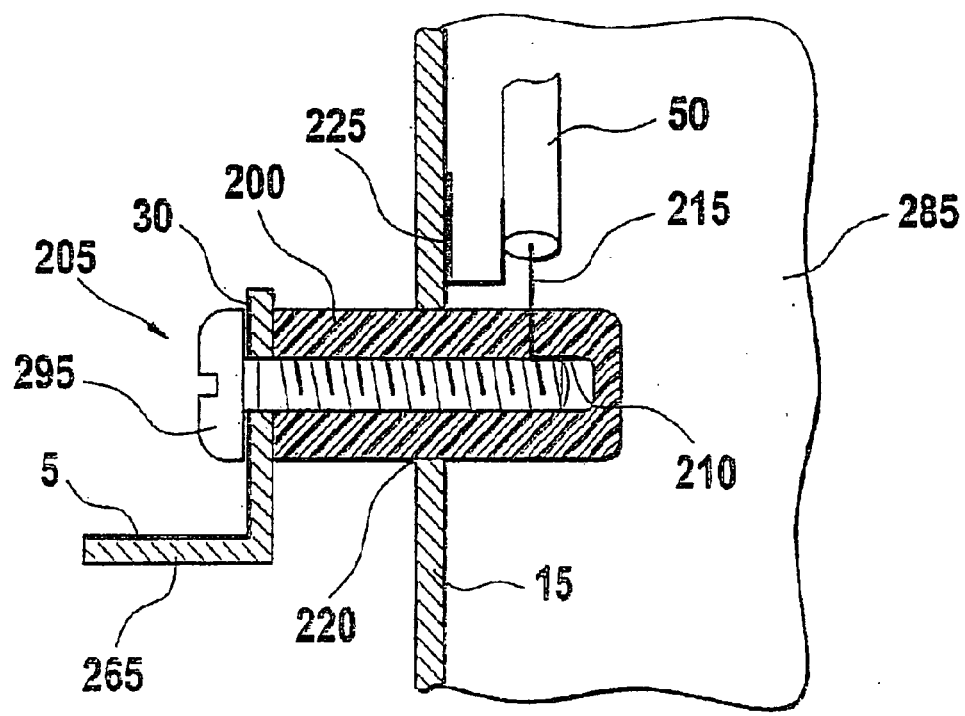
FIG. 3 is a sectioned depiction of an attachment arrangement for attaching an antenna element of the bumper antenna assemblage to the vehicle body, according to a first exemplary embodiment.

According to a first exemplary embodiment as shown in FIG. 3, in which identical reference characters designate elements identical to those in FIG. 4, outer attachment part 205 is embodied as an electrically conductive screw. Peg 200 encompasses a blind hole open to the outside, i.e., facing away from interior 285 of vehicle body 15, having an internal thread into which screw 205 is threaded. First support 265 is clamped nonpositively between head 295 of screw 205 and peg 200, so that in this fashion electrically conductive surface 5 may be permanently mechanically joined to vehicle body 15 via screw 205 and peg 200. In interior 285 of vehicle body 15, inner contact part 210 is embodied as an electrically conductive contact strip that is injection-embedded into peg 200 in watertight fashion and makes contact with inserted screw 205. Electrically conductive contact strip 210 is, at the other end, connected in electrically conductive fashion to inner conductor 215 of first antenna cable 50. Since electrically conductive surface 5 also rests on first support 265 in the region of head 295 of screw 205, it is in electrically conductive connection with head 295 of screw 205 because of the mechanical screw connection described above, so that in this fashion an electrically conductive connection is created from electrically conductive surface 5 to inner conductor 215 of first antenna cable 50. Electrically conductive surface 5 thus constitutes first antenna terminal 30 in the region of head 295 of screw 205. Outer conductor 225 of first antenna cable 50 is, as already described in FIG. 4, connected in electrically conductive fashion to vehicle body 15 in the region of opening 220. With the assemblage described according to FIG. 3 it may be provided, by screwing screw 205 into peg 200, to effect both mechanical joining of electrically conductive surface 5 to vehicle body 15, and electrical contacting of the antenna element, constituted by electrically conductive surface 5, to first antenna cable 50 that continues further.

Figure 5:
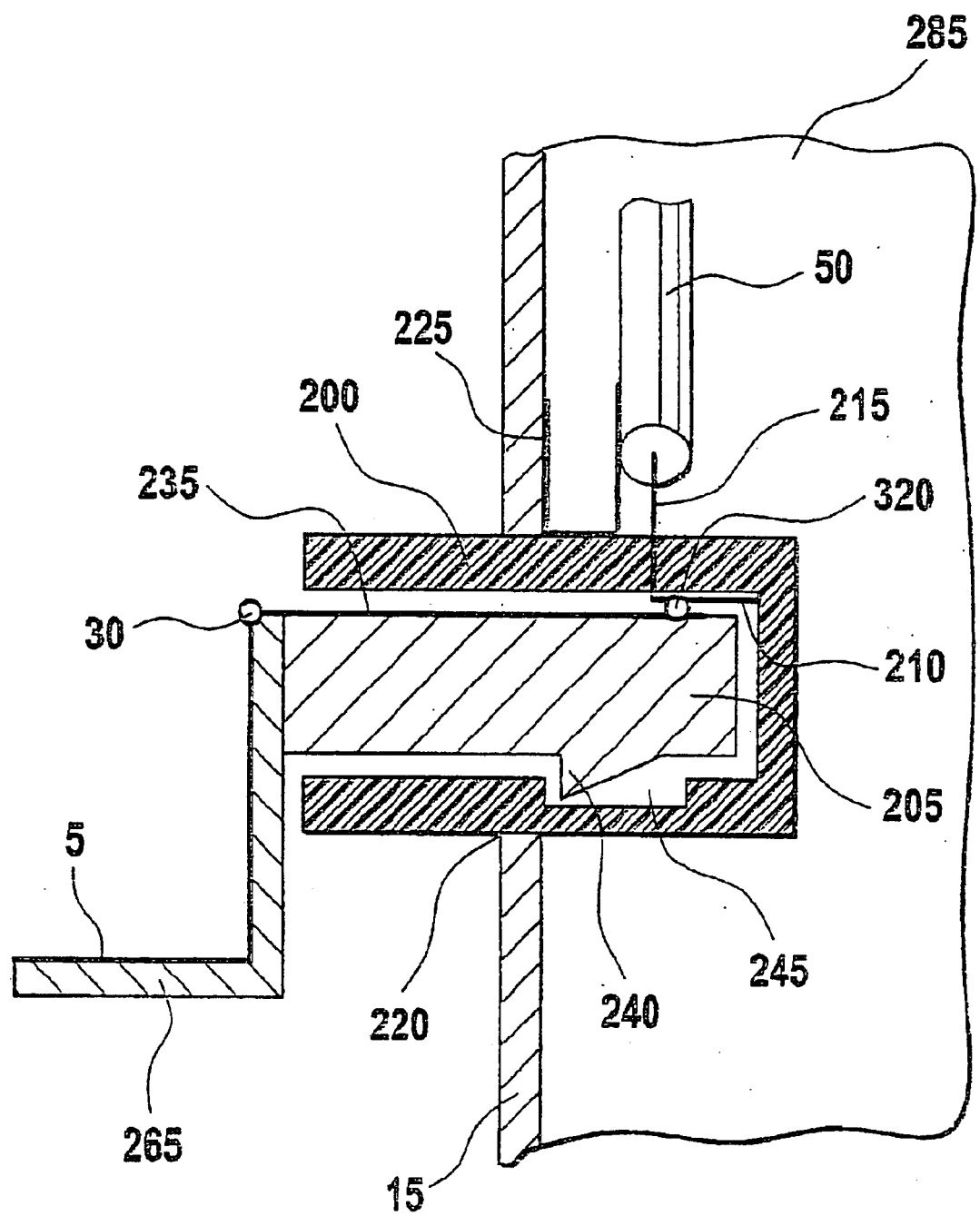
FIG. 5 is a sectioned depiction of the attachment arrangement according to a second exemplary embodiment.

In a second exemplary embodiment as shown in FIG. 5, first support 265 is joined integrally to outer attachment part 205. First support 265 and outer attachment part 205 may be made of electrically insulating material, for example of plastic. Outer attachment part 205 may take the form of a stud that is is introduced into peg 200 and is joined thereto in disengageable but nonpositive fashion via a snap-lock join. In FIG. 5 as well, identical reference characters designate elements identical to those in FIGS. 3 and 4. According to the second exemplary embodiment as shown in FIG. 5, however, outer attachment part 205 may be required to have an electrically conductive part 235 that, after insertion of outer attachment part 205 into peg 200, may make contact with inner contact part 210. In the second exemplary embodiment as shown in FIG. 5, inner contact part 210 is to be embodied as in the first exemplary embodiment according to FIG. 3. Electrically conductive part 235 of outer attachment part 205 transitions, in the direction toward first support 265, into first antenna terminal 30 in the region of the opening of peg 200, and thus into electrically conductive surface 5, so that in this fashion an electrically conductive connection is constituted between electrically conductive surface 5, first antenna terminal 30 thereon, inner contact part 210, and inner conductor 215 of first antenna cable 50, and electrical connection of the antenna element may thus be ensured. In the second exemplary embodiment according to FIG. 5, the connection of outer conductor 225 of first antenna cable 50 to vehicle body 15 is also embodied as in the first exemplary embodiment according to FIG. 3, and is located in the region of opening 220. In all the exemplary embodiments described, this connection represents the required connection of outer conductor 225 of first antenna cable 50 to a reference potential surface. In all the exemplary embodiments described, first antenna cable 50 is embodied as a coaxial cable.

According to the second exemplary embodiment as shown in FIG. 5, the snap-lock join of outer attachment part 205 to peg 200 is embodied so that outer attachment part 205 encompasses a first snap-lock arrangement 240, for example in the form of a snap-lock lug, that participates in the above-described snap-lock join with a second snap-lock arrangement 245 of peg 200, such as, for example, a snap-lock opening. The snap-lock join between outer attachment part 205 and peg 200 is referred to hereinafter as the "first snap-lock join." It may also be implemented by the feature that a snap-lock lug of peg 200 engages into a snap-lock opening of outer attachment part 205. In either case, upon insertion of outer attachment part 205 into the peg, the snap-lock lug snaps into the associated snap-lock opening. As might be expected, more than one first snap-lock join may also be provided between outer attachment part 205 and peg 200, for example in order to provide an even more stable mechanical connection of first support 265 to electrically conductive surface 5 on vehicle body 15.

The peg according to the second exemplary embodiment as shown in FIG. 5 is otherwise, as also in accordance with the first exemplary embodiment shown in FIG. 3, embodied as an externally open blind hole, but this time without an internal thread. Electrically conductive part 235 of outer attachment part 205 may be embodied, for example, as an electrical conductor of planar configuration.

In the second exemplary embodiment according to FIG. 5, installation of the antenna element may be accomplished, for example, in time-saving fashion during series production by simply clipping outer attachment part 205 into peg 200.

Figure 6:
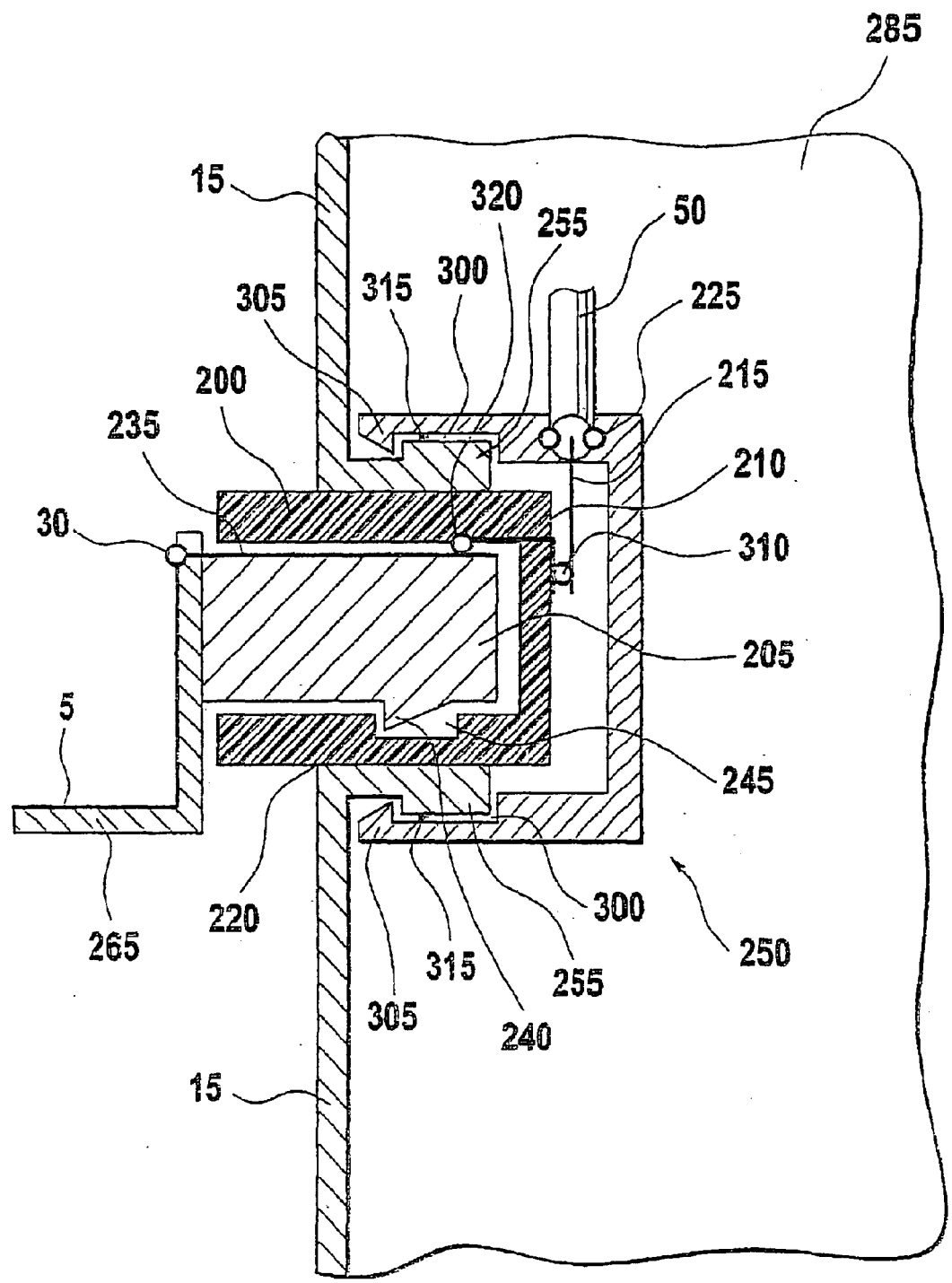
FIG. 6 is a sectioned depiction of the attachment arrangement according to a third exemplary embodiment.

Proceeding from the second exemplary embodiment according to FIG. 5, FIG. 6 shows a third exemplary embodiment for attaching electrically conductive surface 5 to vehicle body 15, and for electrical contacting thereof to first antenna cable 50. Here again, identical reference characters designate elements identical to those in FIGS. 3, 4, and 5. Outer attachment part 205, its connection to first support 265, peg 200, and the first snap-lock join are embodied in the same manner as in the second exemplary embodiment according to FIG. 5. The inner contact part may be embodied differently: in addition to electrically conductive contact strip 210 injection-embedded in watertight fashion into peg 200, there is now associated with it a second support 250 that is made of (for example, metallic) electrically conductive material and is connected in electrically conductive fashion directly to outer conductor 225 of first antenna cable 50. First antenna cable 50 may in this fashion also be mechanically attached to second support 250 and removed therefrom. Via a second snap-lock join, second support 250 is, according to the third exemplary embodiment shown in FIG. 6, snap-locked to vehicle body 15 in interior 285 of vehicle body 15 in the region of peg 200. For that purpose, second support 250 has, according to the third exemplary embodiment as shown in FIG. 6, at least two snap-lock openings 300 into which snap-lock lugs 255 of vehicle body 15 engage. Snap-lock lugs 255 of vehicle body 15 on the other hand at least partially surround peg 200, so that second support 250 is placed onto peg 200 from interior 285 of vehicle body 15. The second snap-lock join may also be constituted by snap-lock lugs of second support 250 that engage into snap-lock openings of vehicle body 15, in which case the part of vehicle body 15 carrying the snap-lock openings again at least partially surrounds peg 200. In the third exemplary embodiment shown in FIG. 6, the second snap-lock join is created by the feature that second support 250 is placed, from interior 285 of vehicle body 15 and in the direction toward peg 200, on the latter, in which context snap-lock hooks 305 that terminate snap-lock openings 300 of second support 250 are initially pushed outward because of snap-lock lugs 255 of vehicle body 15 and deflect back again at the end of snap-lock lugs 255, in order to engage behind snap-lock lugs 255 of vehicle body 15 and thereby create a nonpositive join between second support 250 and vehicle body 15. For this reason, second support 250 is embodied flexibly, such as, for example, in the region of its snap-lock openings 300 and its snap-lock hooks 305. Upon placement of second support 250 onto vehicle body 15 via the second snap-lock join, first antenna cable 50 is conveyed to peg 200, its protruding inner conductor 215 coming into electrically conducting contact with electrically conductive contact strip 210. This is depicted via a third connecting point 310 shown in FIG. 6. As a result of the second snap-lock join, electrically conductive second support 250 makes contact with vehicle body 15. This is represented by the two fourth connecting points 315 in FIG. 6, and as a result thereof, outer conductor 225 of first antenna cable 50 is connected to the reference potential surface, once again in the region of opening 220 of vehicle body 15 as was also the case in the previous two embodiments according to FIG. 3 and FIG. 5. The electrically conductive connection between inner conductor 215 of first antenna cable 50 and electrically conductive surface 5 is now, in the third exemplary embodiment according to FIG. 6, created via third connecting point 310, electrically conductive contact strip 210 which is once again injection-embedded in watertight fashion into peg 200, the electrically conductive connection to electrically conductive part 235 of outer attachment part 205, and first antenna terminal 30. The connection between electrically conductive contact strip 210 and electrically conductive part 235 of outer attachment part 205 is designated in FIGS. 5 and 6 as fifth connecting point 320.

In the third exemplary embodiment as shown in FIG. 6, first antenna cable 50 may also, via second support 250, be conveyed to electrically conductive contact strip 210 in simple and (for example, in series production) time-saving fashion by clipping second support 250 onto vehicle body 15 in accordance with the second snap-lock join.

The second snap-lock join may be embodied disengageably: it may be disengaged by bending back snap-lock hooks 305 and removing second support 250 from vehicle body 15. The first snap-lock join according to the second exemplary embodiment and third exemplary embodiment, as shown in FIGS. 5 and 6, may not be embodied disengageably if no access is created to snap-lock opening 245 of peg 200 through which snap-lock lug 240 of outer attachment part 205 could be pushed back.

In a further exemplary embodiment that is not depicted, provision may also be made for outer attachment part 205 to be attached to peg 200 via a screw connection in accordance with the first exemplary embodiment shown in FIG. 6, and for first antenna cable 50, as in the third exemplary embodiment shown in FIG. 6, to be conveyed to electrically conductive contact strip 210 via the second snap-lock join.

In this case both the connection between outer attachment part 205 and peg 200, and the connection between second support 250 and vehicle body 15, may be disengageable. In the third exemplary embodiment according to FIG. 6, as described, second support 250 also belongs to the inner contact part in addition to electrically conductive contact strip 210, since it also ensures, such as, for example, contacting of outer conductor 225 to vehicle body 15.

In the first exemplary embodiment according to FIG. 3, outer attachment part 205 in the form of the screw is joined disengageably to peg 200, whereas electrically conductive contact strip 210, representing the inner contact part, is permanently joined to peg 200. In the second exemplary embodiment according to FIG. 5, both the join between outer attachment part 205 and peg 200, and the join between peg 200 and electrically conductive contact strip 210 (embodied as the inner contact part), are permanent if the first snap-lock join is not embodied disengageably. Otherwise, both in the second exemplary embodiment according to FIG. 5 and in the first exemplary embodiment according to FIG. 3, outer attachment part 205 is joined disengageably to peg 200, while inner contact part 210 in the form of the electrically conductive contact strip is joined permanently to peg 200. In the fourth exemplary embodiment (not depicted), in which outer attachment part 205 is implemented in accordance with the first exemplary embodiment and the inner contact part in accordance with the is third exemplary embodiment, both outer attachment part 205 and inner contact part 210 are joined disengageably to peg 200.

The attachment of electrically conductive surface 5 to vehicle body 15, and its electrical connection, have been described using the example of first antenna terminal 30 and the associated first antenna cable 50. At all the other antenna terminals that are present, electrically conductive surface 5 may also correspondingly be mechanically joined to vehicle body 15 and electrically connected to the respectively associated antenna cables.

The electrically insulated parts used, made of, for example, plastic, may have low dielectric losses in the frequency region provided for bumper antenna assemblage 1.

What is claimed is:

1. A bumper antenna assemblage, comprising:
an antenna element arranged as an electrically conductive surface in a bumper of a vehicle, the electrically conductive surface being arranged with respect to a body panel, on a side facing toward a vehicle body, to form a slot therebetween, the electrically conductive surface having at least one further slot;
at least two antenna terminals arranged at different points on the electrically conductive surface; and
wherein the at least one further slot is arranged to deflect currents flowing in the electrically conductive surface so that a current flow direction becomes longer.

2. The bumper antenna assemblage according to claim 1, further comprising:
a diversity receiver; and
a plurality of antenna cables connecting the antenna terminals to the diversity receiver.

3. The bumper antenna assemblage according to claim 2, wherein the diversity receiver includes several simultaneously active inputs.

4. The bumper antenna assemblage according to claim 2, wherein the diversity receiver includes inactive inputs, each of which is electrically disconnected from a respectively associated antenna terminal.

5. The bumper antenna assemblage according to claim 4, further comprising:
a controlled switch to disconnect an inactive input of the diversity receiver from the respectively associated antenna terminal.

6. The bumper assemblage according to claim 5, wherein the controlled switch includes a PIN diode.

7. The bumper antenna assemblage according to claim 5, further comprising:
a control signal transmitted on an antenna cable associated with the controlled switch to activate the controlled switch, the control signal being superimposed on an antenna signal.

8. The bumper antenna assemblage according to claim 1, wherein the electrically conductive surface extends over an entire width of the bumper.

9. The bumper antenna assemblage according to claim 1, wherein the antenna terminals are arranged spaced apart on the electrically conductive surface at least by a specified distance so that antenna signals obtained for individual antenna terminals differ substantially from one another.

10. The bumper antenna assemblage according to claim 1, further comprising:
an attachment arrangement to mechanically connect the electrically conductive surface to the vehicle body at a location of at least one of the antenna terminals.

11. The bumper antenna assemblage according to claim 10, wherein the attachment arrangement includes a peg made of electrically nonconductive material and an outer attachment part that carries the electrically conductive surface and receives an associated one of the antenna terminals, the peg receiving the outer attachment part, outside of and electrically insulated from the vehicle body, the peg further receiving an inner contact part inside the vehicle body that ensures electrical connection between the associated antenna terminal through the peg, and an inner conductor of an antenna cable associated with the associated antenna terminal, the peg configured to be guided through an opening of the vehicle body and sealing off the opening in a watertight fashion.

12. The bumper antenna assemblage according to claim 11, wherein the peg is made of plastic.

13. The bumper antenna assemblage according to claim 11, wherein the antenna cable includes an outer conductor connected in electrically conductive fashion to the vehicle body.

14. The bumper antenna assemblage according to claim 13, further comprising:
a cover cap to enclose the peg in an interior of the vehicle and to connect the outer conductor to the vehicle body.

15. The bumper antenna assemblage according to claim 11, further comprising:
an electronic circuit having an input connected to the associated antenna terminal through the peg, and an output side connected to the inner conductor, the electronic circuit being received by the inner contact part.

16. The bumper antenna assemblage according to claim 15, wherein the electronic circuit includes an amplifier circuit.

17. The bumper antenna assemblage according to claim 11, further comprising:
an electrically conductive part connected in an electrically conducting fashion to the associated antenna terminal;
wherein the inner contact part is configured as an electrically conductive contact strip that is injection-embedded in watertight fashion into the peg and makes contact with the electrically conductive part.

18. The bumper antenna assemblage according to claim 11, wherein the outer attachment part is configured as an electrically conductive screw and is threaded into the peg.

19. The bumper antenna assemblage according to claim 11, wherein the outer attachment part includes a first snap-lock arrangement.

20. The bumper antenna assemblage according to claim 19, wherein the first snap-lock arrangement includes a snap-lock lug.

21. The bumper antenna assemblage according to claim 19, wherein the first snap-lock arrangement participates in a first snap-lock join with a second snap-lock arrangement.

22. The bumper assemblage according to claim 21, wherein the second snap-lock arrangement includes a snap-lock opening.

23. The bumper antenna assemblage according to claim 11, further comprising:
a third snap-lock arrangement arranged in the vehicle body; and
a support to receive the antenna cable and to snap-fit with the third snap-lock arrangement in a region of the peg to form a second snap-lock join to convey the antenna cable to the inner contact part.

24. The bumper antenna assemblage according to claim 23, wherein the antenna cable includes an outer conductor and the support is made of an electrically conductive material and is contacted to the outer conductor.

25. The bumper antenna assemblage according to claim 11, wherein the outer attachment part is joined permanently to the peg and the inner contact part is joined disengageably to the peg.

26. The bumper antenna assemblage according to claim 11, wherein the outer attachment part is joined disengageably to the peg and the inner contact part is joined permanently to the peg.

27. The bumper antenna assemblage according to claim 11, wherein the outer attachment part is joined disengageably the peg and the inner contact part is joined disengageably to the peg.

* * * * *